United States Patent
Murray et al.

[15] 3,660,131
[45] May 2, 1972

[54] SATIN WHITE PROCESS AND PRODUCT

[72] Inventors: Margaret H. Murray, Stamford; Earl E. Brodhag, Westport, both of Conn.

[73] Assignee: Time, Incorporated, New York, N.Y.

[22] Filed: Nov. 10, 1969

[21] Appl. No.: 875,531

[52] U.S. Cl............................................106/306, 106/308 B
[51] Int. Cl..............................................................C09c 1/02
[58] Field of Search............................106/306, 308 B; 23/52

[56] References Cited

UNITED STATES PATENTS 2,435,600   2/1948   Rafton......................................106/306

Primary Examiner—James E. Poer
Assistant Examiner—J. V. Howard
Attorney—Brumbaugh, Graves, Donohue & Raymond

[57] ABSTRACT

Satin white coating pigment of improved uniformity which gives paper coatings having improved physical properties can be prepared by slowly adding an aqueous solution of alum or aluminum sulfate to a stirred aqueous dispersion containing slaked lime or calcium hydroxide and sodium hydroxide.

3 Claims, No Drawings

SATIN WHITE PROCESS AND PRODUCT

The present invention relates to an improved satin white coating pigment and to a process for the production thereof.

In U.S. Pat. No. 3,212,919, there is disclosed a high quality printing paper having a light weight double coating thereon wherein the pigment in the prime coating is principally or entirely satin white. Satin white is a needle shaped or acicular pigment which is calcium sulfoaluminate having the generally accepted formula

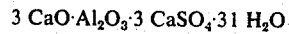

$$3\,CaO \cdot Al_2O_3 \cdot 3\,CaSO_4 \cdot 31\,H_2O$$

It has been found that the conventional processes for preparing satin white by the reaction between alum or aluminum sulfate and slaked lime or calcium hydroxide do not yield a consistent or uniform freshly prepared satin white from batch to batch. As a consequence thereof, the properties of each freshly prepared batch need to be determined before a requisite prime coating composition for paper can be properly made therefrom or alternatively the satin white must be aged prior to use. Moreover, it has been further found that conventionally prepared satin white and prime coating compositions thereof show a marked tendency toward gelation and contain relatively large grits of satin white which result in streaked coatings and fouling of trailing blade coaters.

It is, therefore, an object of the present invention to provide a process for preparing fresh satin white coating pigment of improved uniformity. A further object of the invention is to provide an improved satin white from which coating compositions can be prepared which are free of grits and from which prime coated papers can be made having improved physical properties without having to age the satin white.

In general, the process of the invention comprises reacting alum or aluminum sulfate with slaked lime or calcium hydroxide in the presence of sodium hydroxide. It is theorized that the sodium hydroxide enables the satin white to achieve rapidly a state of metastable equilibrium. It has been found quite unexpectedly that the presence of sodium hydroxide will enable the preparation of a satin white coating pigment of improved uniformity when freshly prepared which gives paper coatings having improved physical properties. This result is particularly unusual when it is considered that the fresh preparation of satin white in the presence of sodium sulfate, rather than in the presence of sodium hydroxide, does not give much improved properties.

More particularly, in the process of the invention an aqueous solution containing from about 0.265 to about 0.333 mole of alum or aluminum sulfate is slowly added to a stirred aqueous dispersion containing about 2 moles of slaked lime or calcium hydroxide and from about 0.03 to about 0.07 mole of sodium hydroxide. The slow rate of addition of the alum or aluminum sulfate is exemplified hereinafter and the time is directly proportional to the batch size of the satin white product. During the process the reaction temperature is maintained at from about 25° to about 43° C., usually from about 26° to about 30° C. It is particularly beneficial in the process of the invention to use a slight molar excess of the calcium hydroxide and to use about 0.274 mole of the aluminum sulfate or alum and about 0.05 mole of the sodium hydroxide additive. Of course, the process of the invention can be practiced using other amounts of these reagents so long as the above relative amounts thereof are maintained.

The process and product of the invention and their advantages will be further illustrated by the comparative examples set forth below.

EXAMPLE 1 – 15

To a fine dispersion of 148 grams (2 moles) of slaked lime or calcium hydroxide in 516 grams of water containing 2 grams (0.05 mole) of sodium hydroxide there was slowly added over a period of about 45 minutes through a spray nozzle 395 grams (0.274 mole) or about 310 cc of 1.273 specific gravity aqueous solution of alum or aluminum sulfate. During the addition of the alum solution, stirring with a blending or kneading action was employed and the reaction temperature was maintained at 28° C. ± 2° C. The reactor was covered throughout the addition and during the one hour of stirring following the addition.

Five replicates (Examples 1–5) were prepared by the above procedure. Ten additional comparative replicates were prepared by the above procedure wherein in five of them (Examples 6–10) the sodium hydroxide was omitted and in the other five (Examples 11–15) an equivalent amount (3.55 grams or 0.025 mole) of sodium sulfate was substituted for the sodium hydroxide.

In each of the three sets of replicates prepared by the above procedure three 1.273 specific gravity alum solutions were used. The three alum solutions were prepared from alums obtained from two different suppliers in two commercial grades of purity. In Table I below, the particular alum solution used in the replicate is indicated as Alum A, B or C.

The satin white pastes or slips prepared in the presence of sodium hydroxide (Examples 1–5) were smooth and creamy and free of grits. On the other hand, the comparative satin white pastes prepared in the absence of an additive (Examples 6–10) or in the presence of sodium sulfate (Examples 11–15) contained relatively large grits.

The analytical tests run on the 15 satin whites are shown in Table I below. The Baroid determinations of cake volume and filtrate volume were made and the percent voids calculated therefrom. The Baroid procedure is a pressure filtration of 400 grams of satin white pigment slip which is continued until the filtrate release is negligible, i.e., about 1.5 hours. At this point in the filtration, it is theorized that the pigment particles are in the positions of closest approach to each other and that the interparticle voids are still completely filled with filtrate. The filtration is carried out in such a way that no channeling of gas through the filter cake can occur. The filter cake volume and the filtrate volume per 100 g. of satin white are obtained by direct measurement. ("The Apparatus and Procedure For Field Testing of Drilling Muds," Section 900, pages 900–16 to 900–20, Baroid Drilling Mud Data Book, Baroid Division, National Lead Company.) The percent voids is calculated as follows:

100 – % air dried solids = total aqueous phase per 100 g. slip

Total aqueous phase – Baroid filtrate per 100 g. slip = aqueous phase in cake

% voids = aqueous phase in cake/cake volume per 100 g. slip

TABLE I.—ANALYSIS OF THE FIFTEEN REPLICATES

| Example No. | Additive | Alum type | Alum conc. in satin white,[1] cc. | Air dried solids[2] percent | Oven dried solids,[3] percent | Baroid determinations | | Percent voids |
|---|---|---|---|---|---|---|---|---|
| | | | | | | Cake volume,[4] cc. | Filtrate volume,[4] cc. | |
| 1 | NaOH | C | 309 | 35.7 | 24.0 | 49.7 | 34.8 | 59.3 |
| 2 | NaOH | A | 311 | 35.8 | 24.1 | 48.2 | 36.0 | 58.7 |
| 3 | NaOH | B | 311 | 35.7 | 24.1 | 48.7 | 36.0 | 58.1 |
| 4 | NaOH | B | 311 | 36.0 | 34.1 | 49.0 | 35.3 | 58.6 |
| 5 | NaOH | B | 310 | 36.2 | 23.9 | 48.4 | 35.9 | 57.6 |
| 6 | None | C | 308 | 35.8 | 24.1 | 48.6 | 36.2 | 57.6 |
| 7 | do | B | 310 | 35.5 | 24.0 | 47.1 | 38.4 | 55.4 |
| 8 | do | A | 312 | 35.7 | 23.8 | 45.2 | 40.0 | 53.8 |
| 9 | do | C | 310 | 35.9 | 23.9 | 47.4 | 36.2 | 58.8 |
| 10 | do | C | 310 | 35.8 | 23.8 | 47.2 | 37.0 | 57.7 |
| 11 | Na₂SO₄ | C | 310 | 35.8 | 24.1 | 49.5 | 34.8 | 59.5 |
| 12 | Na₂SO₄ | B | 311 | 36.2 | 24.3 | 49.7 | 34.7 | 58.6 |
| 13 | Na₂SO₄ | A | 311 | 35.5 | 24.0 | 52.8 | 30.6 | 64.2 |
| 14 | Na₂SO₄ | C | 309 | 35.7 | 24.0 | 51.2 | 33.0 | 61.1 |
| 15 | Na₂SO₄ | B | 313 | 35.9 | 24.1 | 51.8 | 30.9 | 64.2 |

TABLE II.—MAXIMUM VARIATION BETWEEN SAMPLES

| Example No. | Additive | Baroid cake vol./100 g. satin white, cc. | Baroid filtrate vol./100 g. satin white, cc. | Percent voids |
|---|---|---|---|---|
| 1-5 | .05 mol NaOH | 48.2-49.7 (1.5) | 34.8-36 (1.2) | 57.6-59.3 (1.7) |
| 6-10 | No additive | 45.2-48.6 (3.4) | 36.2-40 (3.8) | 53.8-58.8 (5.0) |
| 11-15 | .025 mol Na₂SO₄ | 49.5-52.8 (3.3) | 30.6-34.8 (4.2) | 58.6-64.2 (5.6) |

[1] By titration of sample with standard dilute alum solution and back calculation to the volume of 1.273 sp. gr. alum solution per 2 moles of calcium hydroxide.
[2] Constant weight at 52% relative humidity.
[3] Two hours at 105-110° C.
[4] Per 100 g. of satin white.
NOTE.—The Baroid determinations and the percent voids calculations given in Table I above are presented in summary form in Table II below for more ready comparison of the data variations.

From the data set forth in Tables I and II above, it is readily apparent that the process of the invention produces a freshly prepared satin white of improved uniformity or reproducibility as confirmed by the Baroid measurements and percent voids derived therefrom. Thus, it will be noted that the maximum variation between samples of satin white freshly prepared in the presence of or containing sodium hydroxide (Examples 1-5) was only about one third that of the other two comparative series wherein the satin white was freshly prepared either in the absence of an additive (Examples 6-10) or in the presence of sodium sulfate (Examples 11-15) as a sodium ion-containing additive. Such latter appreciable variations between batches of fresh satin white will produce variations between prime coating compositions thereof and render more difficult the prime coating of paper due to the necessity of compensating coating adjustments.

Prime coating compositions were prepared using each of the above fifteen satin white pigments and hydroxyethylated starch as the binder. The compositions were aqueous slurries containing about 24 percent oven dry solids made up of the suspended satin white pigment and the dissolved starch binder, the pigment to binder oven dry weight ratio being about 100:46. The prime coating compositions were applied to both sides of a cellulosic fiber paper by a trailing blade coater with a total of 3 pounds of solids per ream (1.5 pounds of solids per side per ream). The coated papers were dried to constant moisture content at 70° F., 50 percent R.H. and passed six times (three on each side) through the nip between unheated calender rolls, one being a steel and the other being a Teflon covered roll, loaded at a pressure of 60 pounds per square inch. Optical data on the coated paper sheets are shown in Table III below.

The optical data in Table III above show that satin white prepared in the presence of sodium hydroxide gives prime coated papers having improved physical properties compared with coated papers wherein the satin white pigment of the coating composition is prepared in the absence of an additive or is prepared in the presence of a sodium sulfate additive. Thus, the prime coated papers prepared from the satin white product of the invention (Examples 1-5) had superior or higher brightness, opacity and gloss values and had superior or lower smoothness values than did the prime coated papers which used satin whites which had been prepared in the absence of an additive (Examples 6-10) or had been prepared in the presence of a sodium sulfate additive (Examples 11-15). Although the superiority in optical values of the prime coated paper is numerically small, the improved values are highly significant to a publisher of high quality magazines.

The satin whites of the invention which were prepared in the presence of sodium hydroxide and the prime coating compositions formed therefrom were smooth and creamy, whereas the ten comparative satin whites and the coating compositions prepared therefrom showed a marked tendency toward gelation and contained quantities of relatively large grits which caused streaking of the coating and which fouled the coating blade by being trapped therebehind and serving as nuclei for the agglomeration thereat of the coating compositions.

It will be appreciated that various modifications and changes may be made in the process and product of the invention by those skilled in the art without departing from the essence of the invention and that accordingly the invention is to be limited only within the scope of the appended claims.

What is claimed is:

1. A process for preparing satin white coating pigment of improved uniformity which gives paper coatings having improved physical properties, said process comprising slowly adding an aqueous solution containing from about 0.265 to about 0.333 mole of aluminum sulfate to a stirred aqueous dispersion containing about 2 moles of calcium hydroxide and from about 0.03 to about 0.07 mole of sodium hydroxide while maintaining the reaction temperature at from about 25° to about 43°C.

2. The process as defined by claim 1 wherein the amounts of aluminum sulfate and sodium hydroxide are respectively about 0.0274 mole and about 0.05 mole.

3. The process as defined by claim 1 wherein the reaction temperature is maintained at from about 26° to about 30°C.

\* \* \* \* \*

TABLE III.—OPTICAL MEASUREMENTS ON PRIME COATED PAPER

| Example No. | Additive | G.E. brightness | | B&L opacity | Sheffield smoothness | | Gardiner gloss | |
|---|---|---|---|---|---|---|---|---|
| | | Wire side | Felt side | | Wire side | Felt side | Wire side | Felt side |
| 1 | NaOH | 65.7 | 65.8 | 88.5 | 39 | 33 | 26 | 26 |
| 2 | NaOH | 66.7 | 66.5 | 90 | 39 | 33 | 21 | 20 |
| 3 | NaOH | 66.8 | 66.5 | 89.0 | 36 | 31 | 26 | 24 |
| 4 | NaOH | 66.6 | 66.2 | 89.5 | 34 | 31 | 23 | 22 |
| 5 | NaOH | 67.3 | 66.8 | 90.0 | 38 | 33 | 23 | 22 |
| 6 | No additive | 63.5 | 64.1 | 87.5 | 48 | 44 | 19 | 16 |
| 7 | do | 64.6 | 64.4 | 88.0 | 46 | 36 | 18 | 17 |
| 8 | do | 65.5 | 65.0 | 88.0 | 42 | 33 | 21 | 20 |
| 9 | do | 64.0 | 64.1 | 88.0 | 45 | 38 | 19 | 18 |
| 10 | do | 63.5 | 63.1 | 88.0 | 50 | 42 | 18 | 17 |
| 11 | Na₂SO₄ | 64.6 | 65.5 | 88.5 | 44 | 35 | 21 | 21 |
| 12 | Na₂SO₄ | 66.1 | 65.2 | 88.5 | 43 | 38 | 22 | 21 |
| 13 | Na₂SO₄ | 66.6 | 65.8 | 89.0 | 44 | 34 | 20 | 19 |
| 14 | Na₂SO₄ | 66.7 | 66.4 | 89.0 | 38 | 33 | 24 | 23 |
| 15 | Na₂SO₄ | 65.5 | 64.6 | 88.5 | 38 | 35 | 24 | 22 |
| AVERAGE VALUES | | | | | | | | |
| 1-5 | NaOH | 66.6 | 66.4 | 89.4 | 37 | 32 | 24 | 23 |
| 6-10 | No additive | 64.2 | 64.1 | 87.9 | 46 | 39 | 19 | 18 |
| 11-15 | Na₂SO₄ | 65.9 | 65.5 | 88.7 | 41 | 35 | 22 | 21 |

PO-1050
(5/69)

UNITED STATES PATENT OFFICE
CERTIFICATE OF CORRECTION

Patent No. __3,660,131__     Dated __May 2, 1972__

Inventor(s) __Margaret H. Murray et al__

It is certified that error appears in the above-identified patent and that said Letters Patent are hereby corrected as shown below:

Col. 1, line 45, "much" should read --such--;

Col. 2, Table I, Example 4, in col. headed "Oven dried solids", figure "34.1" should be --24.1--;

Col. 3, lines 11 through 17 - this text should follow Table I and precede Table II; and Col. 4, line 43, "0.0274" should be --0.274--.

Signed and sealed this 19th day of September 1972.

(SEAL)
Attest:

EDWARD M. FLETCHER, JR.
Attesting Officer

ROBERT GOTTSCHALK
Commissioner of Patents